Jan. 23, 1968 L. JUY 3,364,763
CHANGE SPEED GEAR CONTROL DEVICE
Filed Dec. 7, 1965
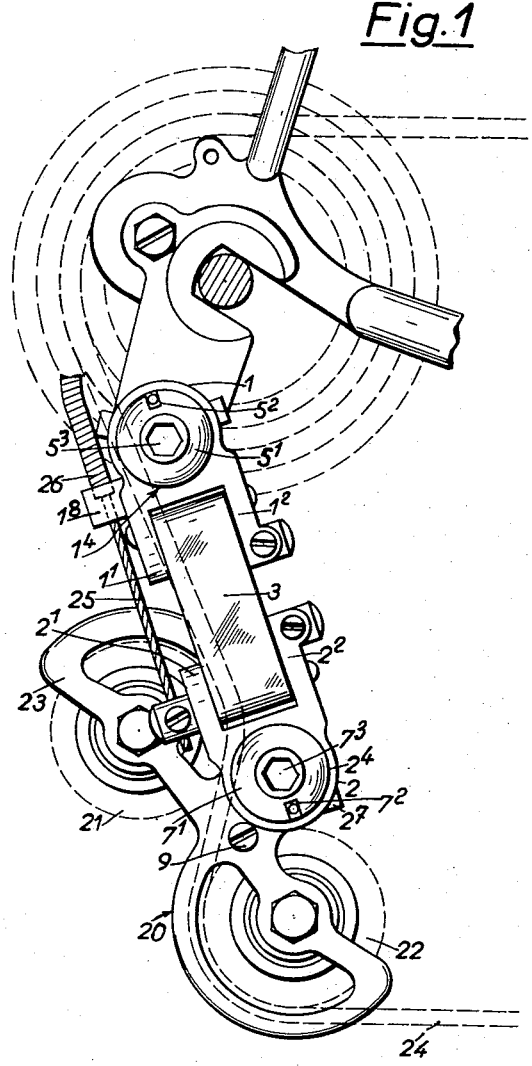
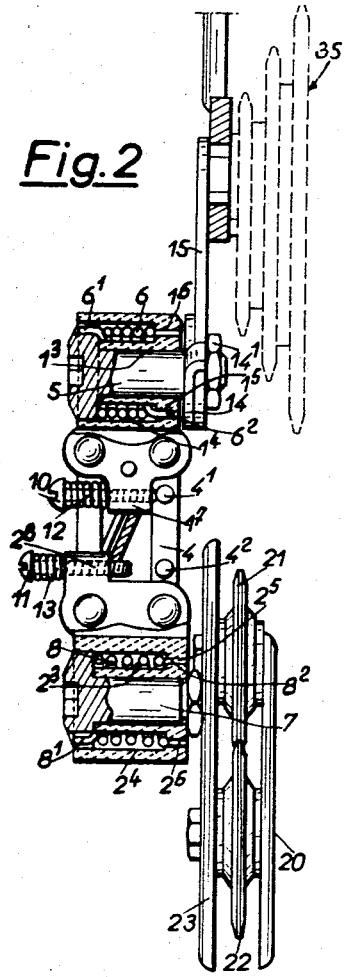

United States Patent Office 3,364,763
Patented Jan. 23, 1968

3,364,763
CHANGE SPEED GEAR CONTROL DEVICE
Lucien Juy, 75 Rue General-Fauconnet,
Dijon, Cote d'Or, France
Filed Dec. 7, 1965, Ser. No. 512,069
Claims priority, application France, Dec. 14, 1964, 979
4 Claims. (Cl. 74—217)

ABSTRACT OF THE DISCLOSURE

A change speed gear control in which an upper support member is resiliently and pivotably connected to a frame member and a lower support member is resiliently and pivotably connected to a chain guide assembly which moves a vehicle drive chain from one diameter sprocket to another to change the drive of a wheel, the support members being connected by a parallel linkage affording lateral movement of the lower support during a gear changing operation. Each support member includes a casing provided with a cylindrical partition in a bore in the casing, and the resilient and pivotable connections of the support members are made by a pivot pin mounted in each partition and respectively secured to the frame member and the chain guide assembly, each pin receiving in a head thereof one end of a coil spring, the other end of which is secured in an aperture in the associated casing.

The present invention relates to change-speed gear control devices for bicycles or like chain driven vehicles and is concerned with a derailleur gear assembly.

An object of the present invention is to provide an improved change-speed gear control device.

According to the present invention there is provided for use in combination with a chain driven vehicle wheel having multiple coaxial chain driven sprockets of different diameters, a change-sped gear control device mountable on a frame member of said vehicle and comprising a normally upper support member and a normally lower support member, a first resilient pivotal means for connecting said upper support member to said vehicle frame member, a chain guide assembly for moving the vehicle chain transversely from one sprocket to another, a second resilient pivotal means connecting said lower support member to said chain guide assembly, a parallel linkage between said upper and lower support members affording lateral movement of said lower support member with respect to said upper support member during a gear changing operation, each of said support members being moulded from a synthetic plastic material and comprising a base, a casing on one side of said base forming a mounting for the associated resilient pivotal connecting means and arranged to enclose said connecting means, and a set of flanges extending from the opposite side of said base and connected to said parallel linkage.

In order that the present invention may be more clearly understood and readily carried into effect, one embodiment thereof will now be described in detail with reference to the accompanying drawing, in which:

FIGURE 1 is a side elevation view of a change-speed gear control device of the invention, and FIGURE 2 is a part sectioned end elevation view of the change-speed gear control device of FIGURE 1.

Referring now to the drawing, support members 1 and 2, which are made of a plastic material, are provided respectively with a closed portion forming a casing and an open portion having the form of a yoke with transverse sides $1^1$, $1^2$ and $2^1$–$2^2$ respectively. The respective sides $1^1$ $1^2$ and $2^1$ $2^2$ pivotally support levers 3 and 4 to provide a deformable parallel linkage which together with said support members 1, 2 constitutes a parallelogram of the change-speed gear control device. These levers 3 and 4 are also made of plastic material.

The upper support member 1 is provided in the closed portion thereof with an axial cylindrical partition $1^3$ serving for the internal centering of a metal pivot 5 the cylindrical head $5^1$ of which is lodged in a chamber formed at the end of a bore $1^4$ formed in the support member 1.

The articulation pivot 5 is thus centered in the upper support member 1 through the intermediary of two large concentric bearing faces. An annular recess between the bore $1^4$ and the outer diameter of the cylindrical partition $1^3$ accommodates a coil spring 6 having out-turned ends $6^1$ and $6^2$ which are respectively located in a notch $5^2$ formed in the head $5^1$ of the pivot 5 and in one of two apertures $1^5$ and $1^6$ formed in the end face of the support member casing 1. The circular tensioning of the coil spring 6 is achieved by rotating the pivot 5 through the intermediary of a hexagonal recess $5^3$ formed in the head $5^1$ thereof. The locking in position of the said spring 6 is effected by means of a washer 14 the axial aperture of which is formed with a flat and is made fast in rotation with a screw-threaded end of the pivot 5, whereas the periphery of said washer is formed with tongues $14^1$ which are diametrically and oppositely bent out to form a stop relative to a securing lug 15 mounted on a bicycle frame. It should be noted that the apertures $1^5$ and $1^6$ formed in the end face of the support member casing 1 permit, by simple displacement of the engaging spring end $6^2$, a modification in the circular tension imparted to the coil spring 6. This feature permits a judicious choice of the spring tension, giving due regard to the deviations in the toothing of the free wheel utilized, so as to obtain, in combination with the inner articulation arrangement, correct taking-up of the "slack" of the chain.

In order to simplify assembly and to diminish the cost price, the support may be made with a boss $1^8$ formed with a shouldered aperture for passage of a control cable 25 while supporting a sheath 26 thereof.

With the above described arrangement an extremely strong support is obtained which permits, due to the guiding of the pivot 5 over the entire length thereof, articulation of said pivot without play and with practically no wear. Also a support forming a fluid-tight casing which protects the articulation arrangement and the coil spring 6 from foreign bodies and the influence of the weather is obtained. This support is part of a simple assembly and furthermore permits the tension of the articulation spring to be modified.

A similar arrangement is provided in respect of the lower articulation assembly which also comprises a support member made of plastic material and having a cylindrical and axial partition $2^3$ through which extends a metal pivot 7 and a head $7^1$ embedded in a chamber formed at the end of a bore $2^4$ in the said support member 2. A coil spring 8 is disposed in the recess formed between the bore $2^4$ and the outer diameter of the cylindrical partition $2^3$ and is retained in position by out-turned ends $8^1$ and $8^2$ respectively engaged in a notch $7^2$ formed in the head $7^1$ of the pivot 7, and, on the opposite side, in one of two apertures $2^5$ and $2^6$ formed in the end face of the support member casing 2.

A chain guide assembly 20 comprising two chain wheels 21, 22 mounted in a frame 23 is carried by the end of the pivot 7 remote from the head $7^1$. This guide assembly is thus mounted for pivotal movement and is adapted to guide the bicycle chain 24 for engagement around a sprocket of a sprocket group 35. Lateral displacement of the guide assembly 20 by the parallelogram will cause the chain 24 to move from one sprocket to another of said group.

A projecting heel 2⁷ is provided on the lower part of the support member 2 to prevent the deterioration of the spring in consequence of excessive rotation of the chain-guide assembly (in the case for example of manual control).

In fact, in cases of extreme utilization of the change-speed gear, the chain-guide assembly oscillates in such manner as to take up a position substantially perpendicular to the levers 3 and 4 of the parallelogram. The position of the projecting heel 2⁷ is thus judiciously established for permitting a rod 9 integral with the chain-guide frame to be supported in such manner as to limit the oscillation of the said chain-guide assembly in accordance with the normal capacity of the spring 8.

The invention further provides regulating and abutment means for limiting the deformation amplitude of the parallelogram formed by the support members 1 and 2 and the levers 3 and 4.

For this purpose, each support member 1 and 2 is provided, along the outer face of one of the transverse sides $1^2$, $2^2$ of the portion forming an open yoke, with a boss $1^7$, $2^8$ through which a screw 10, 11 respectively extends. Each of these screws is retained in position with the intermediary of a coil spring 12, 13 operating in compression. The inner lever 4 has, opposite the screws 10 and 11, two studs $4^1$ and $4^2$. It will thus readily be understood, that due to the deformations in the parallelogram, the studs $4^1$ and $4^2$ alternately abut against the end of the screws 10 and 11. Consequently, by screwing or unscrewing the position of the said screws in the bosses thereof which are integral with the support members, it becomes possible to modify the amplitude of the transverse displacements of the chain-guide assembly carried by the articulated parallelogram.

Deformations of the articulated parallelogram are obtained through the intermediary of the control cable 25 operable to displace the support member 2 laterally with respect to the support member 1 against the action of a return spring which is not shown in detail.

With the regulating device described hereinabove the two screws 10 and 11 are readily accessible and are disposed on the same side of the apparatus to facilitate simple and precise adjustment and to provide an economical design. It is also possible to achieve the complete transverse immobilization of the assembly of the parallelogram by using screws of appropriate length. This immobilization permits the constant alignment of the said chain guide on one of the sprockets of the free wheel (in the case of rupture of the control cable, for example).

I claim:
1. For use in combination with a chain driven wheel of a vehicle having multiple coaxial chain driven sprockets of different diameters, a change-speed gear control device mountable on a frame member of the vehicle and comprising a normally upper support member and a normally lower support member, a first resilient pivotal means connecting said upper support member to said vehicle frame member, a chain guide assembly for moving the vehicle chain transversely from one sprocket to another, a second resilient pivotal means connecting said lower support member to said chain guide assembly, a parallel linkage connecting said upper and lower support members affording lateral movement of said lower support member with respect to said upper support member during a gear changing operation, each of said support members being moulded from a synthetic plastic material and comprising a base, a casing on one side of said base forming a mounting for the associated resilient pivotal connecting means and arranged to enclose said connecting means, and a set of flanges extending from the opposite side of said base and connected to said parallel linkage, the casing of each support member having a bore, a cylindrical partition coaxially provided in the bore of the casing of each support member, said first and second pivotal means comprising cylindrical metal pivot pins mounted in respective partitions and including heads seated in corresponding bores of the associated casings, and coil springs mounted in respective support members in an annular recess defined between the associated cylindrical partition and casing bore, each said spring having one end anchored in a notch provided in the associated pivot pin head and an opposite end anchored in an aperture formed in the casing.

2. A change-speed gear control device according to claim 1, further comprising a control cable for operating said device, a sheath covering said cable and a boss provided on the normally upper support member and defining a shouldered aperture for the passage of said control cable and for the support of said cable sheath.

3. A change-speed gear control device according to claim 2, further comprising a projecting heel provided on the normally lower support member and arranged to limit forward angular displacement of said chain-guide assembly and thus prevent damage of the associated coil spring.

4. A change-speed gear control device according to claim 1, further comprising a boss provided on each support member, adjustable spring biased abutment screws carried one in each boss and stop means on the parallel linkage and arranged to abut said adjustable abutment screws to limit displacement of said parallel linkage.

References Cited

UNITED STATES PATENTS

| 732,035 | 6/1955 | Great Britain | 74—217 |
| 931,849 | 7/1963 | Great Britain | 74—217 |

OTHER REFERENCES

Juy: Belgian application 625,167, Mar. 15, 1963.

FRED C. MATTERN, JR., *Primary Examiner.*

J. A. WONG, *Assistant Examiner.*